United States Patent
Paek

(10) Patent No.: US 6,295,395 B1
(45) Date of Patent: Sep. 25, 2001

(54) TRUE TIME DELAY GENERATION UTILIZING BROADBAND LIGHT SOURCE WITH FIBER CHIRP GRATING ARRAY AND ACOUSTO-OPTIC BEAM STEERING AND 2-D ARCHITECTURES

(75) Inventor: Eung G. Paek, Germantown, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/009,224

(22) Filed: Jan. 20, 1998

Related U.S. Application Data
(60) Provisional application No. 60/036,408, filed on Jan. 31, 1997.

(51) Int. Cl.[7] ................................ G02B 6/28; H01Q 1/00
(52) U.S. Cl. .................................. 385/24; 385/7; 385/37; 343/720; 343/721; 343/778
(58) Field of Search .................................. 372/20; 385/24, 385/31, 37, 14, 7; 343/720, 721, 778; 359/127, 130

(56) References Cited

U.S. PATENT DOCUMENTS

| | | | |
|---|---|---|---|
| 4,017,807 | * 4/1977 | Hutcheson et al. | .............. 372/20 |
| 4,118,675 | * 10/1978 | Rahn et al. | .............. 372/20 |
| 5,051,754 | 9/1991 | Newberg . | |
| 5,103,495 | 4/1992 | Goutzoulis . | |
| 5,305,009 | 4/1994 | Goutzoulis et al. . | |
| 5,400,162 | 3/1995 | Newberg et al. . | |
| 5,461,687 | 10/1995 | Brock . | |
| 5,475,392 | 12/1995 | Newberg et al. . | |
| 5,663,736 | 9/1997 | Webb et al. . | |
| 5,793,907 | * 8/1998 | Jalali et al. | .............. 385/24 |
| 5,920,413 | * 7/1999 | Miyakawa et al. | .............. 385/24 |
| 6,020,986 | * 2/2000 | Ball | .............. 385/24 |
| 6,137,442 | * 10/2000 | Roman et al. | .............. 385/37 |

OTHER PUBLICATIONS

Lembo et al., Low Loss Fiber Optic Time–Delay Element for Phased Array Antennas, Proc. SPIE, vol. 2155, pp 13–28, 1994 No Month.

Ng et al., High–Precision Detector Switched Monolithic GaAs Time Delay Network for the Optical Control of Phased Arrays, IEEE Photon. Technol. Lett., vol. 6(2), pp 231–234, 1994 No Month.

Tangonan et al., Optoelectric Switching for Antenna Networks, IEEE Photon. Technol. Lett., vool. 6(8), pp. 975–977, 1994, No Month.

Riza, Liquid Crystal Based Optical Time Delay Units for Phased Array Antennas, J. of Lightwave Technol., vol. 12 (8), 1440–1447, 1994 No Month.

Yao et al., A Novel 2–D Programmable Photonic Time Delay Device for Millimeter Wave Signal Processing Applications, IEEE Photon. Technol. Lett., vol. 6(12), pp. 1463–1465, 1994 No Month.

(List continued on next page.)

Primary Examiner—Brian Healy
(74) Attorney, Agent, or Firm—Harris & Burdick

(57) ABSTRACT

System and method for rapidly reconfigurable two-dimensional true time delay generation for phased array antennas is described. The system utilizes a broadband light source, an array of fiber chirp gratings in a single fiber, and an acousto-optic spectrometer to generate a time-delayed linear grating. The grating is subsequently rotated to the desired angle utilizing an acousto-optic device having no moving parts.

16 Claims, 3 Drawing Sheets

OTHER PUBLICATIONS

Essman et al., Fiber–Optic Prism True Time Delay Antenna Feed, IEEE Photon. Technol. Lett., vol. 5, pp. 1347–1349, 1993 No Month.

Essman et al., Two Optical–Control Techniques for Phase Array Interferometric and Dispersiver Fiber True Time Delay, Proc. SPIE, vol. 1958, pp 133–143, 1993 No Month.

Morey et al., Photoinduced Bragg Gratings in Optical Fibers, Optics & Photonics News, pp. 8–14, Feb. 1994.

Ball et al., Programmable Fiber Optic Delay Line, IEEE Photon. Technol. Lett., vol. 6(6), pp. 741–743, 1994 No Month.

Molony et al., Fiber Grating Time Delay Element for Phased Array Antennas, Electron. Lett., vol. 31(17), pp. 1485–1486, 1995 No Month.

Goutzoulis et al., Prototype Binary Fiber Optic Delay Line, Opt. Eng., vol. 28, No. 11, pp. 1193–1202, 1989 No Month.

Cohen et al., Programmable Optically Controlled Serially Fed Phased Array Antenna, PSAA–7 Proceedings of 7th DARPA Symposium on Photonic Systems for Antenna Applications, Monterey, CA, pp. 15–19, Jan. 1997.

Tong et al., Fiber Grating Programmable Dispersion Matrix for Two Dimensional Multiwavelength Optically Controlled Phase Array Antennas, Electron. Lett., vol. 32, pp. 1532, Aug. 15, 1996.

Wu et al., Bragg Fiber Grating for Optically Controlled Phase Array Antennas, PSAA–7 Pdoceedings of 7th DARPA Symposium on Photonic Systems for Antenna Applciations, Monterey, CA, pp. 3–7, Jan., 1997.

Freitag et al., A Coherent Optically Controlled Phased Array Antenna System, IEEE Microwave and Guided Wave Letters, vol. 3(9), pp 293–295, 1993 No Month.

Horikawa et al., Photonic Switched True Time Delay Beam Forming Network Integrated on Silica Waveguide Circuits, IEEE MTT–S Digest, TUiC–6, pp. 65–68, 1995 No Month.

* cited by examiner

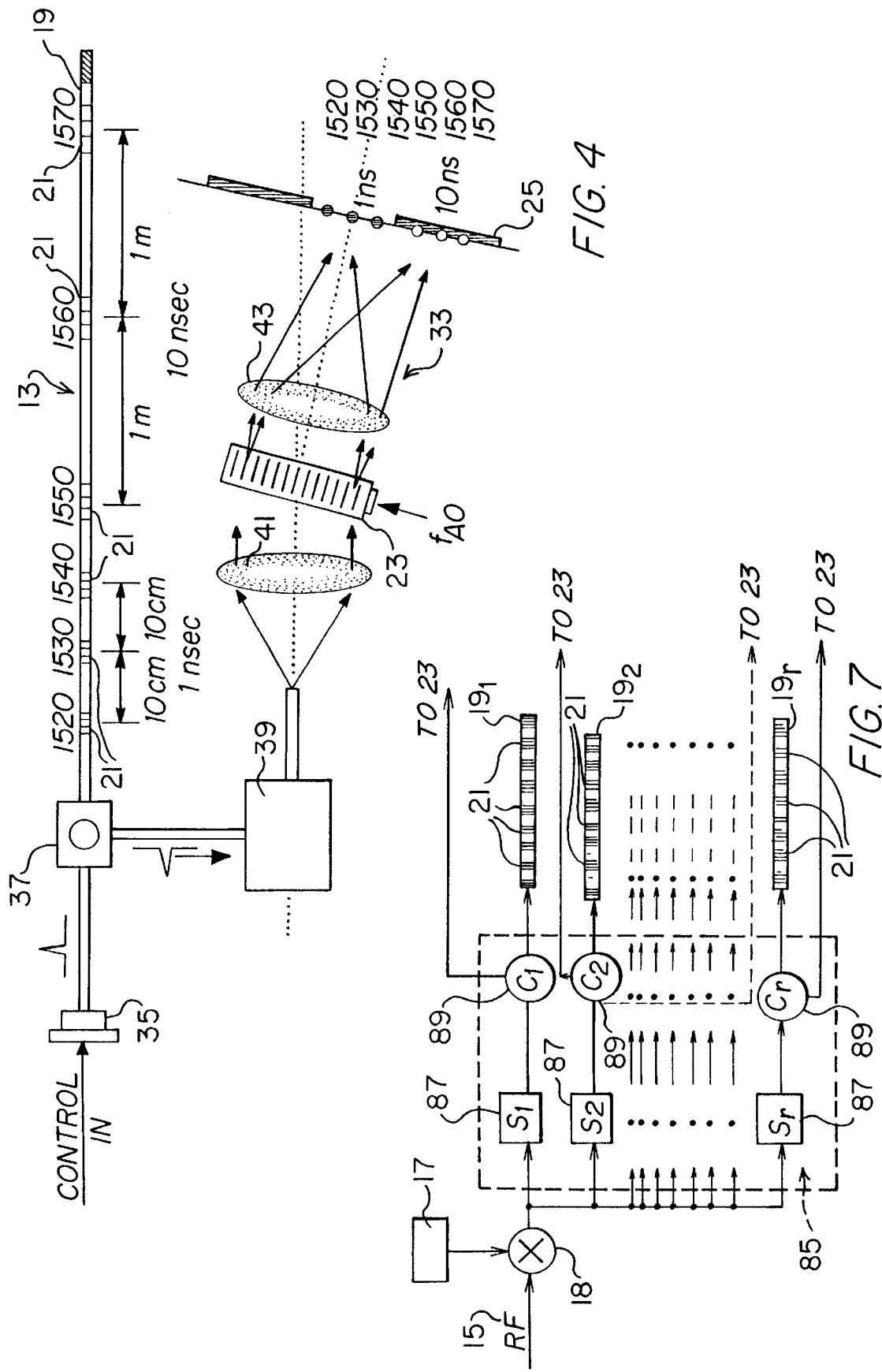

TRUE TIME DELAY GENERATION UTILIZING BROADBAND LIGHT SOURCE WITH FIBER CHIRP GRATING ARRAY AND ACOUSTO-OPTIC BEAM STEERING AND 2-D ARCHITECTURES

RELATED U.S. PROVISIONAL PATENT APPLICATION

This application is related to U.S. Provisional Patent Application No. 60/036,408, pending, entitled "A 2-D True Time Delay Architecture for Phased Array Antennas Using Fiber Chip Gratings and Acousto-Optic Beam Deflectors" by Eung G. Paek filed Jan. 31, 1997, makes claim to the invention disclosed therein, and is a continuation-in-part of said U.S. Provisional Patent Application.

FIELD OF THE INVENTION

This invention relates to phased array antenna systems, and, more particularly, relates to optical true time delay generation methods and architecture for such systems.

BACKGROUND OF THE INVENTION

The phased array antenna is one of the most advanced radar technologies which allows multiple bean pointing and fast non-mechanical steering of microwave beams. The technology has promise for broad-band (2–20 GHz) free-space radar communications that can be used for a variety of commercial and military applications. Beam pointing/steering control systems are known, including true time delay systems and phase shift systems, for phased array antenna, true time delay systems being preferable since the steered beam angle is independent of frequency and squint is eliminated.

For a given microwave frequency f and number of microwave radiating elements along one direction N, the maximum time delay $\Delta t_{max}$ required to steer a beam over ±90° is given by N/f. Also, the minimum temporal resolution $\Delta \tau_{min}$ to achieve resolution R is given by $1/(f \cdot R)$. Assuming a frequency range of 2–20 GHz, N=100 and R=1,000, $\Delta t_{max}$= 5–50 nsec and $\Delta \tau_{min}$=0.05–0.5 psec.

In conventional electronic RF systems, true time delay is achieved using switched lengths of electrical waveguide or cable. Such devices tend to be bulky, expensive, have high loss at high frequencies, and are susceptible to electrical crosstalk (due to electromagnetic interference) and temperature induced time delay changes. Recent advances in photonic technology can provide a better implementation of true time delay due to a natural high parallelism and large bandwidth as well as immunity to electromagnetic interference.

Heretofore known or suggested photonic true time delay systems have been configured so that each microwave element requires R fixed time delay generators, R switches and an R to 1 combiner. Thus, for a two dimensional (2-D) array with $N^2$ elements in such systems, $N^2R$ time delays and $N^2R$ switches have been required. The insertion loss is mainly determined by the R to 1 combiner and is given by $10 \log_{10}R$. Although such a system is capable of adaptive beam forming as well as beam steering, it requires a tremendous amount of complexity, making its hardware implementation extremely difficult.

Although this complexity can be reduced to some degree by free-space path-switching methods, this still requires a cascaded array of many independent time-delay generators and parallel ($N^2$) switches in 2-D spatial light modulators. Moreover, thus configured, the system presents other limitations, such as speed and path-dependent insertion loss.

A highly dispersive fiber prism method has been suggested and/or utilized that can significantly reduce the complexity as described above. However, this method requires very long (20 km for 1 GHz), $N^2$ fiber bundles and a fast tunable narrow linewidth light source with broad tuning range. It has been suggested that the long length could be significantly reduced by using an array of fiber gratings, but significant problems with this implementation would yet be posed. Most of the heretofore suggested approaches for use of fiber gratings as a means to generate true time delays employ an array of normal single frequency fiber gratings, the desired time delays being selected by a tunable narrow linewidth light source. To achieve high resolution, both a broad tuning range and a narrow linewidth are required. Moreover, the wavelength would need to be changeable rapidly (within a few microseconds—a speed unattainable by current laser technology) for effective implementation.

In addition, two dimensional (2-D) extension architecture for such photonic true time delay systems as have been heretofore suggested could utilize further improvements. Conventional image rotation has been accomplished, for example, by rotating a dove prism by an angle θ around the optical axis, the output image thus being rotated by 2θ. Such conventional rotation thus requires mechanical movement of components and is, therefore, inherently slow and lacking adequate unreliability.

SUMMARY OF THE INVENTION

This invention provides a true time generating system and method for both one dimensional and two dimensional generation of time delayed gratings for use with phased array antenna systems. This invention includes a delay encoder operable with a broadband light source and utilizing a single optical fiber having an array of fiber chirp gratings therein, an optical signal decoding device for receiving a wavelength encoded light signal and providing as an output therefrom a time delayed grating, and image rotation utilizing acousto-optics and without moving mechanical parts.

The delay encoder fiber chirp gratings are configured so that different wavelengths of the light from the light source are reflected at unique locations at each individual fiber chirp grating, the locations corresponding to different selected time delays, thereby providing a wavelength encoded light signal output. The decoding device receives the wavelength encoded light signal output and utilizes this output to provide a time delayed linear grating as an output therefrom.

An optical amplifier amplifies the wavelength encoded light signal and an acousto-optic deflector having a variable acoustic signal input is positioned to receive the amplified light and disperse the light at selected diffraction angles variable by an acoustic signal at the input. A window is positioned at the output plane from the deflector for selection of an output spectrum from the dispersed light, spectrum selection controlled by diffraction angle selection at the acousto-optic deflector.

The method for generating time delays for phased array antennas of this invention includes launching broadband light into an optical fiber having a plurality of selectively located fiber chirp gratings therealong to provide a wavelength encoded light signal output and dispersing the wavelength encoded light signal output at an output plane. A spectrum from light dispersed at the output plane corresponding to a selected one of the fiber chirp gratings at the optical fiber is selected to thereby provide a selected time delayed linear grating, the grating being rotated to a desired output angle.

Utilizing this invention, the complexity of heretofore known systems can be significantly reduced, requiring only a number of fiber chirp gratings in a single fiber providing the number of different time delays desired. The compact system allows a broad range of time delays that can be reconfigured within a few microseconds, and because of fewer or no mechanical elements and switches, is inherently more reliable.

It is therefore an object of this invention to provide true time delay generation systems and method utilizing a broadband light source and a fiber chirp grating array in a single fiber.

It is another object of this invention to provide true time delay generation systems and method including fully optical delay selection and acousto-optic image rotation.

It is another object of this invention to provide optical true time delay generation systems of reduced complexity, requiring only a number of fiber chirp gratings in a single fiber providing the number of different time delays desired.

It is still another object of this invention to provide true time delay generation systems for phased array antenna systems which are compact, allow a broad range of time delays that can be reconfigured within a few microseconds, and are highly reliable.

It is still another object of this invention to provide a true time delay generating system including a broadband light source, delay encoding means including an optical fiber for receiving light from the broadband light source, the optical fiber having at least a first selectively located fiber chirp grating defined therein so that different wavelengths of the light from the light source are reflected at unique locations at the fiber chirp grating, the locations corresponding to different selected time delays, thereby providing a wavelength encoded light signal output, and decoding means for receiving the wavelength encoded light signal output and utilizing the wavelength encoded light signal output to provide a time delayed linear grating as an output therefrom.

It is yet another object of this invention to provide a 2-d true time delay generating system for phased array antennas including, an optical fiber for receiving light from a broadband light source and including an array of fiber chirp gratings defined therealong, different wavelengths of light from the light source reflected at unique locations at the fiber chirp gratings, the locations corresponding to different selected time delays, an acousto-optic deflector having a variable acoustic signal input for receiving light reflected at the fiber chirp gratings of the optical fiber and dispersing the reflected light at selected diffraction angles variable by an acoustic signal at the input, and an acousto-optic image rotator having no moving parts for receiving light dispersed at the acousto-optic deflector and rotating the dispersed light to a selected output angle.

It is still another object of this invention to provide an optical signal decoding device for receiving a wavelength encoded light signal and providing as an output therefrom a time delayed grating for utilization in a phased array antenna system, the device including amplifying means for optically amplifying a wavelength encoded light signal, an acousto-optic deflector for receiving the amplified light signal and dispersing the light signal at selected diffraction angles to an output plane, and a window at the output plane for selection of an output spectrum from the dispersed light signal, spectrum selection controlled by diffraction angle selection at the acousto-optic deflector.

It is yet another object of this invention to provide a method for generating time delays for phased array antennas including the steps of launching broadband light into an optical fiber having a plurality of selectively located fiber chirp gratings therealong to provide a wavelength encoded light signal output, dispersing the wavelength encoded light signal output at an output plane, selecting a spectrum from light dispersed at the output plane corresponding to a selected one of the fiber chirp gratings at the optical fiber to thereby provide a selected time delayed linear grating, and rotating the time delayed linear grating to a desired output angle.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is another functional illustration of the system substantially in accord with FIG. 3

FIG. 7 is a functional illustration of another embodiment of the system of this invention.

DESCRIPTION OF THE INVENTION

Figure 1:
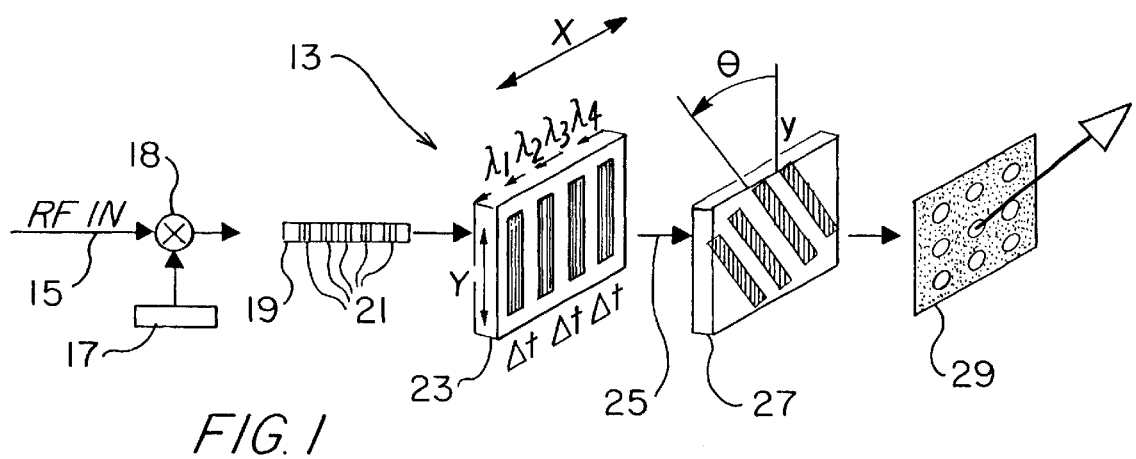
FIG. 1 is a schematic illustration of a 2-d true time delay generation system architecture in accord with this invention.

True time delay control architecture 13 of this invention for generation of a one dimensional (1-D) diffraction grating light pattern whose period (temporal time delay in the true time delay case) and orientation (2-D extension) can be changed rapidly is schematically illustrated in FIG. 1. As may be appreciated from FIG. 1, the complexity of this true time delay system is significantly reduced compared with conventional systems in which provision for all the possible delays are required for each microwave radiating element of a phased array antenna system.

Figure 3:
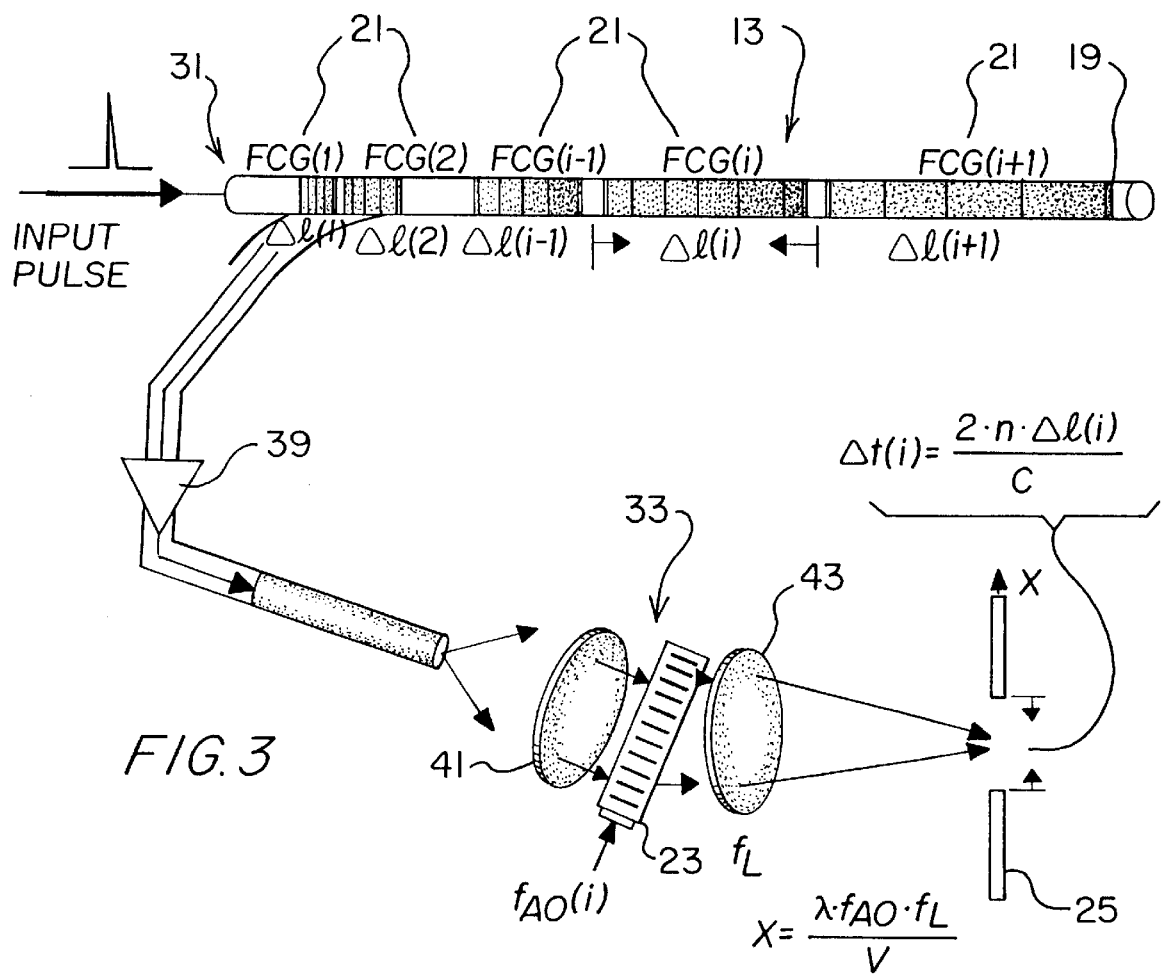
FIG. 3 is a functional illustration of the time delayed linear grating generation system of this invention including encoding and decoding.

In FIG. 1, RF input signal 15 is modulated by CW light source 17 at electro-optic modulator 18 providing light having a broad spectral linewidth (for example, 50 nm), and is launched into single optical fiber 19 having an array of fiber chirp gratings 21 defined therealong (see FIG. 3). Formation of such gratings in optical fiber may be done using known techniques. Each fiber chirp grating 21 defined in fiber 19 has a unique chirp ratio, and thus defines unique time delays. The light from each fiber chirp grating is dispersed along the x direction, or axis, by acousto-optic beam deflector 23 and is stretched along the y direction, or axis.

By adjusting the frequency of acoustic signal applied to acousto-optic beam deflector 23 (for example, using an rf signal adjustable in a range from 30 MHz to 60 MHz under program control to an rf generator or frequency synthesizer), the spectrum from the desired fiber chirp grating 21 is selected and positioned on output window 25. The time-delayed grating thus obtained is subsequently rotated to the desired angle by ultrafast image rotator 27 before output at N×N light to microwave converters 29. In the following, a more detailed explanation the 1-D true time delay system of this invention and its extension to a 2-D case in accord with this invention is provided.

Figure 2:
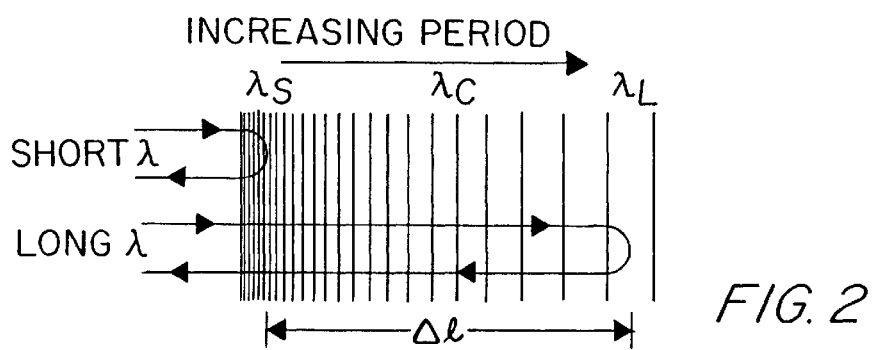
FIG. 2 is a chart illustrating fiber grating position and Bragg wavelength correlation.

In the system of this invention, an array of equally spaced N time delays is generated by a single fiber chirp grating 21. As shown in FIG. 2, the Bragg wavelength of a fiber chirp grating varies linearly as a function of position, from $\lambda_S$ to $\lambda_L$ with the center wavelength $\lambda_C$, over the length $\Delta l$. The wavelength chirp ratio $\Gamma = \Delta\lambda/\Delta l$, $(\Delta\lambda = \lambda_L - \lambda_S)$, is kept constant within a fiber chirp grating. The resultant relative time delays arising from various portions (i.e., single frequency fiber Bragg gratings) of the fiber chirp grating distribute uniformly ranging from 0 to the maximum value $\Delta t = 2 \cdot \eta \cdot \Delta l/C$, where $\eta$ is the refractive index of the fiber core and C is the speed of light in vacuum. Each of these time delays is encoded by the corresponding wavelength, while keeping the ratio $\Delta t/\Delta\lambda$ constant.

One should also note that fiber chirp gratings can be superposed to reduce the total fiber length owing to the phase matching selection property of a volume grating, as long as the total refractive index change does not exceed the maximum limit of the fiber. When the fiber chirp grating is long, it can be discretized to form an array of N short sinusoidal gratings.

The 1-D true time delay control system of this invention includes fiber chirp grating encoder architecture 31 and acousto-optic spectrometer decoder architecture 33 as shown in FIGS. 3 and 4 (each illustrating different aspects of and/or alternatives for the implementation of this invention). Both encoding and decoding are achieved by wavelengths. Fiber chirp grating encoder 31 includes a light pulse generator (either 17/18 as shown in FIG. 1 or utilizing another broadband source such as LED 35 (FIG. 4), or an amplified spontaneous emission source, modulated by an external electro-optic modulator) with broad spectral bandwidth and single fiber 19 (terminated at one end) with an array of fiber chirp gratings 21 in it. Light is circulated at circulator 37 in a conventional fashion (see FIG. 4).

Figure 5:
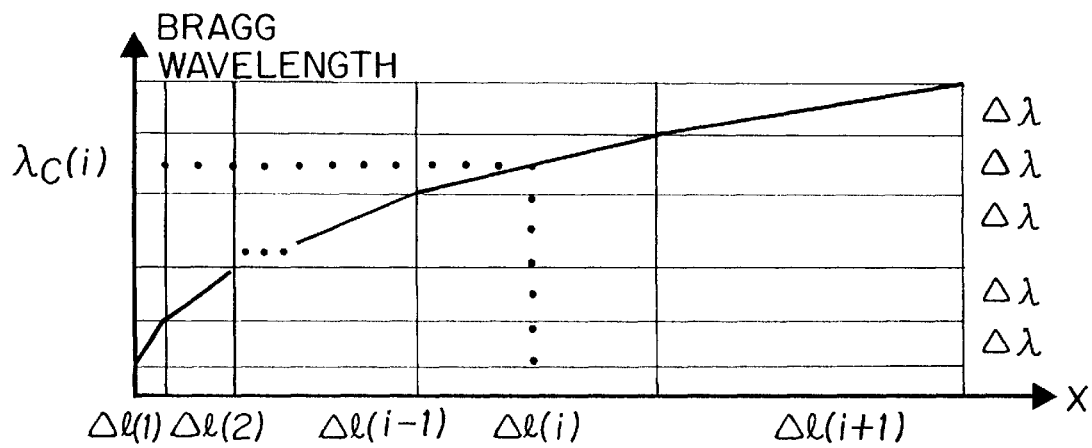
FIG. 5 is a chart illustrating Bragg wavelength distribution along the fiber with reference its FIGS. 2 and 3.

FIG. 5 (referring to FIGS. 2 and 3) illustrates Bragg wavelength distribution inside fiber 19 as a function of position. The i th fiber chirp grating 21 has the length $\Delta l(i) = \Delta l(1) \cdot i$, and all fiber chirp gratings 21 have the same amount of wavelength bandwidth, $\Delta\lambda(i) = \Delta\lambda_{FCG}$=constant. Therefore, the wavelength chirp ratio of the i th fiber chirp grating 21, $\Gamma(i)$, is given by the relation $\Gamma(i) = \Gamma(1)/i$, (or $\Delta t(i) = i \cdot \Delta t(1)$, where $\Gamma(1)$ and $\Delta t(1)$ are defined for the first fiber chirp grating 21.

If light from pulsed source 35 (or, alternatively, CW source 17, or the like, modulated by electro-optic modulator 18 using pulsed microwave signal 15 as shown in FIG. 1) with a wide spectral bandwidth, $\Delta\lambda_{SC}$, is launched into fiber 19, each particular wavelength of the input light is reflected at a corresponding unique fiber chirp grating 21 location to give the desired time delay. In this way, each time delay is encoded by the corresponding wavelength.

The wavelength encoded light signal output from circulator 37 is optically amplified in a single fiber channel by erbium doped fiber amplifier 39 (or an equivalent means of amplification), and is connected with free space acousto-optic spectrometer decoder 33 including spherical lenses 41 and 43 and acousto-optic beam deflector 23. Acousto-optic spectrometer decoder 33 disperses the incoming light like a normal prism, the primary difference between acousto-optic spectrometer decoder 33 and a normal prism being that the diffraction angle can be rapidly (within a few microseconds) varied by simply changing the acoustic frequency applied to acousto-optic beam deflector 23. In acousto-optic spectrometer decoder 33, the light with wavelength $\lambda$ is focused to a point separated from the optical axis by $x = \lambda \cdot f_{AO} \cdot f_L / V_{AO}$, where $f_{AO}$, $f_L$ and $V_{AO}$ represent acoustic frequency applied to acousto-optic beam deflector 23, focal length of lense 41 and acoustic velocity inside the acoustic medium (for example, focal length of lenses 41 and 43 are typically about 5 cm and 20 cm, respectively, and acoustic velocity is typically about 600 m/s in the medium). The spatial extent of the spectrum generated by each fiber chirp grating 21 is given by $\Delta x = \Delta\lambda \cdot f_{AO} \cdot f_L / V_{AO}$.

The temporal delay over each spectrum is $\Delta t(i) = 2 \cdot \eta \cdot \Delta l(i)/C$. Since $\Delta t \Delta\lambda$ and $\Delta x \Delta\lambda$, it follows that $\Delta x \Delta t$. In other words, time delay is uniformly distributed along x providing a suitably time delayed linear grating. At the output plane, window 25 is placed to select the spectrum from the desired fiber chirp grating only. By varying the acoustic frequency $f_{AO}$ such that $f_{AO}(i) \cdot \lambda_C(i)$=constant, the desired i th spectrum can be centered at output window 25 (other spectra being centered at the window by adjusting the frequency accordingly; see FIG. 4).

Also, multiple beam forming can be easily achieved by applying many acoustic sinusoidal frequencies simultaneously to acousto-optic beam deflector 23, without the need for any hardware changes. Window 25 is characterized by a slit with an aperture size of about 0.5 mm to 5 mm depending upon the number of radiating elements.

In this way, time delays encoded to wavelengths in encoder 31 are decoded back to time delays. Owing to fiber chirp gratings 21 and acousto-optic spectrometer decoder 23 combined with output window 25, N element encoding/decoding is achieved simultaneously in parallel in a simple and compact free space system. One great advantage of this free space spreading over the heretofore known dispersive fiber method is that it can avoid the complicated $N^2$ long fiber bundles. In addition, adequate room for optical amplification or means for compensation for misalignment due to temperature changes remains without making the system overly cumbersome. The compact 1-D decoder 33 of this invention can also be integrated using integrated waveguide optics.

The components utilized above may be any of those known to skilled practitioners in the art. For example, modulator 18 may be a Mach-Zehnder electro-optic modulator or multiple-quantum-well based electro-absorptive modulator, and fiber 19 may be formed from optical fiber having germania-doping to increase light sensitivity. Circulator 37 may be a three port device using Faraday isolators to allow reverse signal entering one of the two output ports to be transmitted to the other output port as a usable signal while being completely isolated from the input signal, fiber amplifier 39 is an Erbium-doped amplifier, and lenses 43 are preferably spherical lenses with doublet elements to reduce aberrations. Acousto-optic beam deflector 23 is preferably characterized by large time-bandwidth product (defined by aperture time multiplied by the frequency bandwidth; more than 1,000) and high diffraction efficiency (for instance, utilizing slow shear-mode $TeO_2$ material; more than 30% efficiency preferred at the 1.55 micron wavelength region.

The above-described 1-D true time delay system could be extended to the 2-D case by cascading as heretofore known. In such case, advantages remain in that only N+1 fibers, as opposed to $N^2$ fibers utilized by previous systems, would be required. Moreover, the free space acousto-optic spectrometer 33 can be shared Among N elevation elements (typically up to at least about 1,000).

Figure 6:
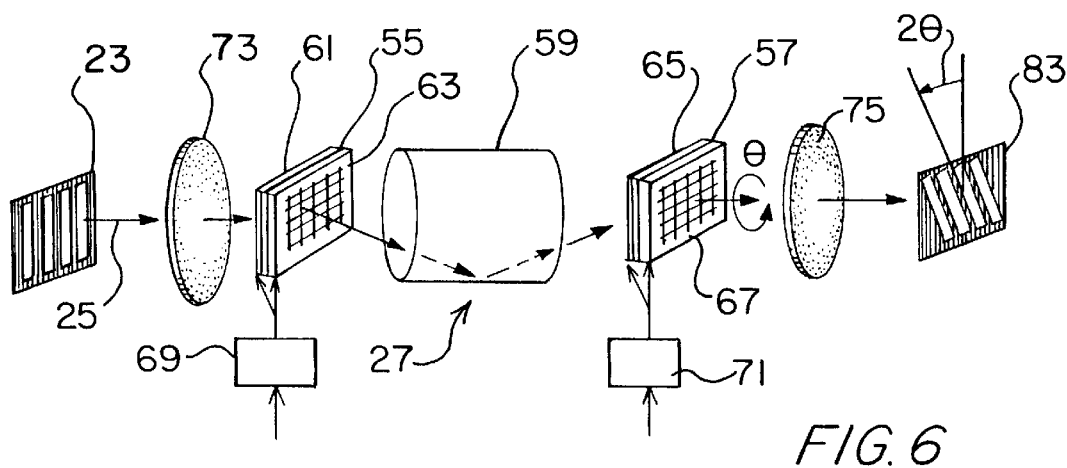
FIG. 6 is a functional illustration of acousto-optic image rotation architecture in accord with this invention.

However, a better means in accord with this invention for extending to 2-D true time delay, and which significantly reduces complexity because of elimination of moving parts, provides ultrafast image rotation utilizing acousto-optic image rotator 27 (a dove prism-like arrangement) as shown in FIG. 6. The system includes a pair of xy-acousto-optic beam deflectors 55 and 57 and circular cylindrical mirror 59 to generate the required inversion operation.

In principle, the rotating wedge prism portions of a conventional dove prism have been replaced by xy-acousto-optic beam deflectors 55 and 57, each consisting of a pair of acousto-optic beam deflectors 61/63 and 65/67, respectively, sandwiched together with transducers along orthogonal directions (slow shear mode $TeO_2$ crystals could be utilized; however, a more compact (10 mm×10 mm×2 mm) crossed deflector with both transducers on the same crystal is preferable). By adjusting the frequencies of acoustic signals applied to the acousto-optic beam deflector pairs 61/63 and 65/67, beam direction can be changed along arbitrary directions, just as a wedge prism does. Since circular cylindrical mirror 59 xs rotationally symmetric, its rotation is not required. However, to prevent unwanted mirror distortion owing to the curvature of the circular mirror surface the cylindrical mirror is preferably discretized to multiple facets. Also, incoming light is focused to have a minimum size on the mirror surface. Therefore, by simply varying the acoustic frequencies, an image can be rotated to arbitrary selected angles, without any moving parts while yet preserving optical transparency.

The rotation angle of an image output from window 25 can be reconfigured (for example, rotated by 180°) within a few microseconds in a programmable manner utilizing frequency synthesizers 69 and 71 (for example, a frequency synthesizer with a frequency sweep range of 30 MHz to 70 MHz, with frequency accuracy of less than 1 Hz and drive output power of up to 1 watt, interfaced with a PC for with fast parallel connectors to allow fast access time, preferably on the order of microseconds). To prevent the unwanted distortion owing to the curvature of the circular mirror surface, the cylindrical mirror is discretized to multiple facets. Also, incoming light is focused to have a minimum beam size on the mirror surface by using lens 73. Lens 75 is used to form an image at output plane 83 (for example, lenses 73 and 75 are spherical doublet lenses having a 20 cm focal length and opposite orientation to compensate for the aberration with each other). Special lens designs could, alternatively, be conceived to compensate for the fixed distortion due to the circular cylindrical mirror surface. It should be recognized that lenses 73 and 75 as shown in the FIGURE could be alternatively positioned relative to beam deflectors 55 and 57, respectively, with each positioned adjacent to opposite ends of mirror 59.

In operation, light representing the time delayed linear grating is located at the front focal plane of lens 73, and is deflected by the crossed acousto-optic beam deflector pair 55 to a selected output angle under control of the acoustic signal input. At the deflected angle, the light is focused on the surface of cylindrical mirror 59. After reflection thereat, the light is deflected again by crossed acousto-optic beam deflector pair 57 (again under control from program controlled frequency synthesizer 71 output acoustic signal) forming a selectively rotated image at output plane 83 (to N×N light to microwave converters 29 of FIG. 1.

The system described hereinabove provides significant advantage over now known conventional systems. For example, conventional systems, including highly dispersive fiber delay systems, require significantly more time delay generators switches and/or fiber bundles (and/or significantly greater fiber length, i.e., translating into much greater total fiber volume) than is required for this invention. These advantages are summarized in Table 1.

TABLE 1

|  | Conventional (1) | HD Fiber (2) | Proposed FCG/AOBD (3) |
| --- | --- | --- | --- |
| # Delays | $N^2R$ | $N^2$ | NR |
| # Switches | $N^2R$ | 2 | 2 |
| # Bundles | $N^2$ | $N^2$ | 1 |
| # Splitters (1 to N) | $2N^2$ | N + 1 | 0 |
| 100 nsec length | 20 m | 20 Km | 10 m |
| Total fiber volume | 3 m × 3 m × 20 m = 180 $m^3$ (4) | 0.1 × 0.1 × 20,000 = 200 $m^3$ | 0.001 ××0.001 × 10 = $10^{-5}$ $m^3$ |

Complexity of various systems: (1) Conventional Photonic Systems, (2) Highly Dispersive fiber systems, and (3) this invention; where N = elements along one direction and R = resolution (Note: 10 cm × 10 cm × 1000 is approximated to 3 m × 3 m)

The maximum number of wavelength channels (or time delays) in the architecture of this invention is determined by such factors as the passband of fiber amplifier 39 (typically 50 nm), the bandwidth of an FBG (i.e., fiber Bragg grating, for example, typically 0.04 nm for a 10 cm long FBG) and the resolution of acousto-optic spectrometer 33. Normally, more than 1,000 time delays can be generated utilizing the invention as illustrated heretofore.

For dense systems, requiring significantly more than 1,000 different time delays (for example up to at least about 10,000), multiplexing architecture 85 as shown in FIG. 7 may be employed, for example, using r optical switches 87 and r circulators 89 in conjunction with r fibers 19 having fiber chirp gratings 21 therein (r equalling the selected extensions required to achieve the desired number of time delays). In this case, fiber chirp gratings 21 are distributed in several fibers and the desired fiber is selected by the corresponding optical switch 87 (for example, under program control from a PC). Even for the system shown in FIG. 7, the number of switches required is determined by the multiplexing number (typically 10) instead of Nr (typically 1,000) to $N^2R$ (typically $10^7$) as would heretofore have been required in conventional systems. An alternative way of multiplexing using optical switches is to employ the conventional binary fiber optical delay line concept by cascading the fibers in series.

As may be appreciated from the foregoing, true time delay control utilizing a specially designed array of fiber chirp gratings in a single fiber with a broadband light source input, and that requires no intermediate photon-to-electron conversion processes, is provided for phased array antenna systems. Each fiber chirp grating in the array is designed to provide a unique linear chirp ratio, and wavelengths do not overlap. Generation of time delays from wavelengths (i.e., utilizing the decoder of this invention) is rapidly accomplished along a wide tuning range and provides a tailored array of selected linear chirp time delays in parallel. 2-D extension is accomplished with far fewer elements than heretofore known and with no moving parts.

What is claimed is:

1. A 2-d true time delay generating system for phased array antennas comprising:

an optical fiber for receiving light from a broadband light source and including an array of fiber chirp gratings defined therealong, different wavelengths of light from said light source reflected at unique locations at said fiber chirp gratings, said locations corresponding to different selected time delays;

an acousto-optic deflector having a variable acoustic signal input for receiving light reflected at said fiber chirp gratings of said optical fiber and dispersing said reflected light at selected diffraction angles variable by an acoustic signal at said input; and an acousto-optic image rotator having no moving parts for receiving light dispersed at said acousto-optic deflector and rotating said dispersed light to a selected output angle.

2. The 2-d true time delay generating system of claim 1 further comprising a window at an output plane from said acousto-optic deflector for selection of a selected spectrum of said dispersed light.

3. The 2-d true time delay generating system of claim 1 wherein said fiber chirp gratings in said array are sufficient in number so that up to at least about 1000 time delays corresponding to wavelength reflection locations are provided.

4. The 2-d true time delay generating system of claim 1 further comprising a plurality of second optical fibers each having an array of fiber chirp gratings defined therealong, and multiplexing means associated with said optical fibers so that up to at least about 10,000 time delays corresponding to wavelength reflection locations are provided.

5. The 2-d true time delay generating system of claim 1 wherein said acousto-optic image rotator includes first and second crossed acousto-optic deflectors at opposite ends of a cylindrical mirror.

6. An optical signal decoding device for receiving a wavelength encoded light signal and providing as an output therefrom a time delayed grating for utilization in a phased array antenna system, said device comprising:

amplifying means for optically amplifying a wavelength encoded light signal;

an acousto-optic deflector for receiving the amplified light signal and dispersing the light signal at selected diffraction angles to provide multiple wavelength spectra linearly arrayed at an output plane; and a window at said output plane for selection of a selected output wavelength spectrum from said multiple wavelength spectra linearly arrayed at said output plane, wherein said selection of a selected output wavelength spectrum is controlled by diffraction angle selection at said acousto-optic deflector.

7. The optical signal decoding device of claim 6 wherein said acousto-optic deflector includes input means for a selectively variable acoustic signal to effect diffraction angle changes within a few microseconds.

8. The optical signal decoding device of claim 6 further comprising an acousto-optic image rotator with no moving parts for rotating said output spectrum to a selected output angle.

9. The optical signal decoding device of claim 8 wherein said acousto-optic image rotator includes a first set of crossed acousto-optic deflectors for deflecting incident light at selected angles.

10. The optical signal decoding device of claim 8 wherein said acousto-optic image rotator includes a cylindrical mirror for rotating incident images at selected angles to an output.

11. A method for generating time delays for phased array antennas comprising the steps of:

launching broadband light into an optical fiber having a plurality of selectively located fiber chirp gratings therealong to provide a wavelength encoded light signal output;

dispersing said wavelength encoded light signal output at an output plane;

selecting a spectrum from light disperser at said output plane corresponding to a selected one of the fiber chirp gratings at said optical fiber to thereby provide a selected time delayed linear grating; and rotating said time delayed linear grating to a desired output angle.

12. The method for generating time delays of claim 11 further comprising the steps of serially selecting different spectra from light dispersed at said output plane corresponding to selected different fiber chirp gratings to selectively provide different time delayed linear gratings, and rotating said different gratings to desired output angles.

13. The method for generating time delays of claim 11 wherein the step of selecting a spectrum from light dispersed at said output plane includes the step of selectively periodically changing diffraction angle of dispersion of said wavelength encoded light signal output to serially present selected spectra at an output window at said output plane.

14. The method for generating time delays of claim 11 further comprising the steps of launching broadband light into a plurality of second optical fibers each having an array of fiber chirp gratings defined therealong so that up to at least about 10,000 time delays are provided.

15. The method for generating time delays of claim 11 further comprising the step of configuring said fiber chirp gratings so that wavelength chirp ratio is constant within any one of said fiber chirp gratings, with each different said fiber chirp grating having a unique wavelength chirp ratio.

16. The method for generating time delays of claim 11 further wherein the step rotating said time delayed linear grating includes acousto-optically rotating said grating without mechanical movement of parts.

* * * * *